April 12, 1927.                      1,624,415
C. H. LOGUE
BEVEL GEAR TESTING MACHINE
Filed May 8, 1924          2 Sheets-Sheet 2
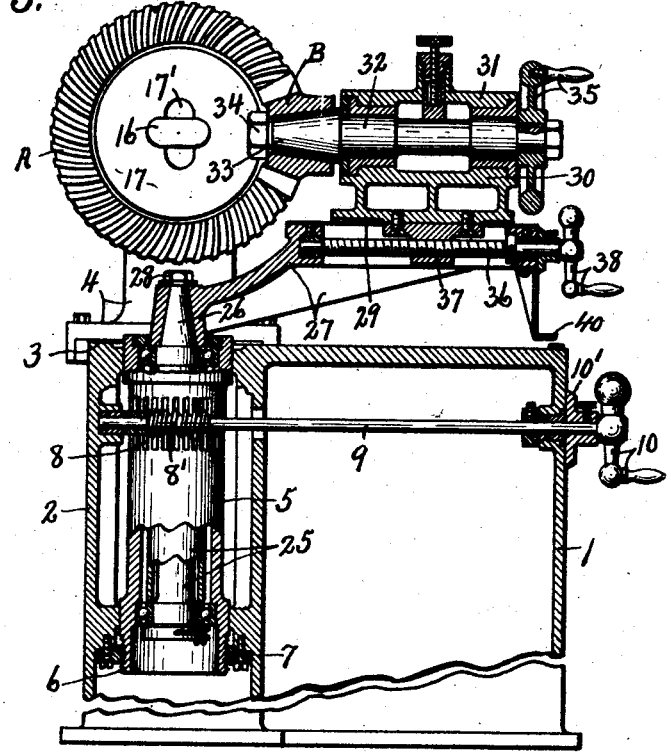
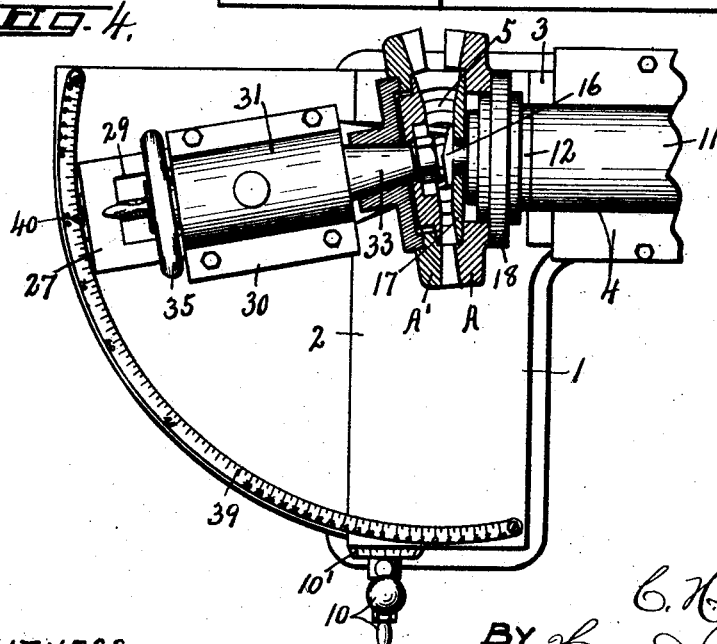

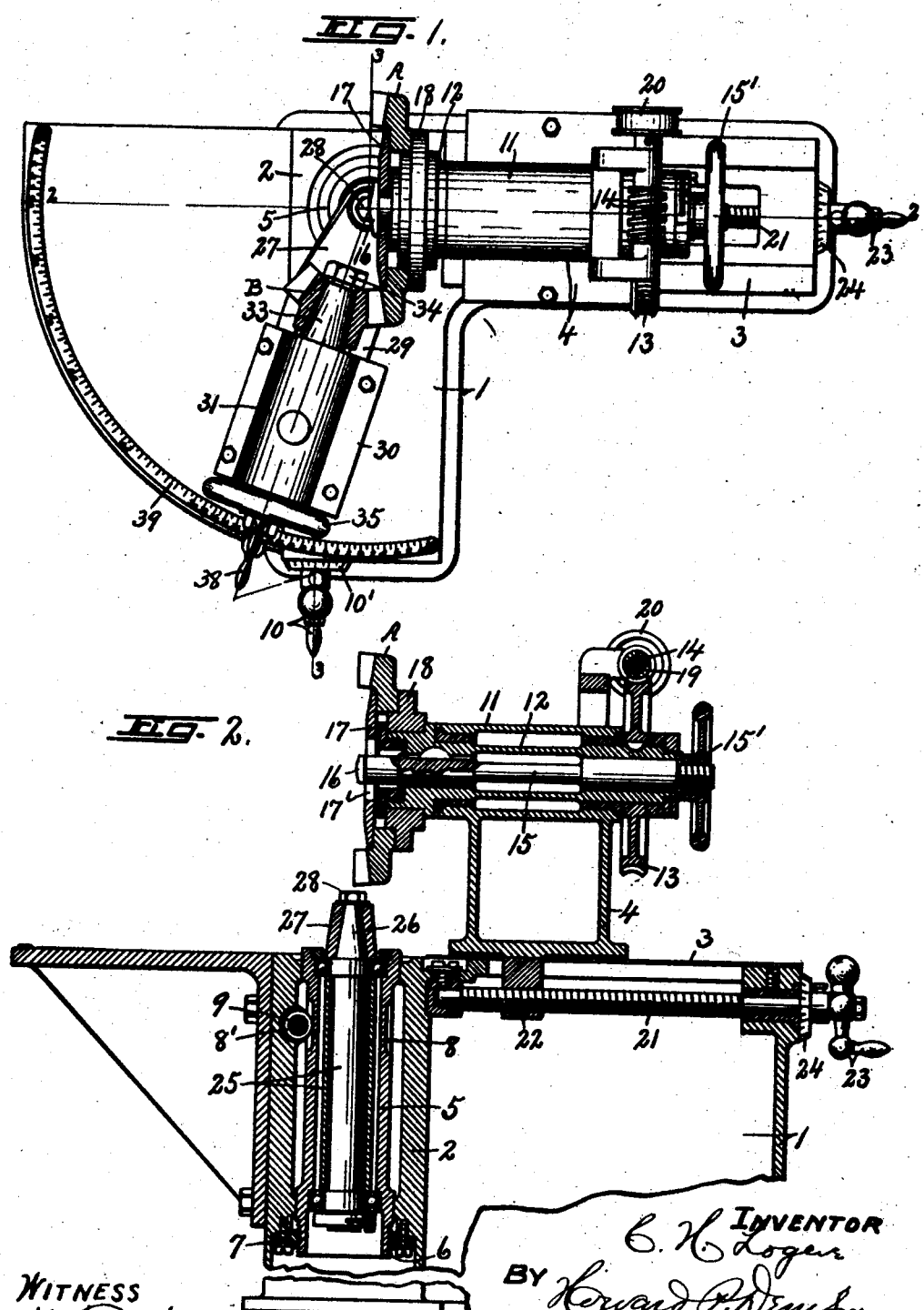

Patented Apr. 12, 1927.

1,624,415

UNITED STATES PATENT OFFICE.

CHARLES H. LOGUE, OF SYRACUSE, NEW YORK, ASSIGNOR TO THE GLEASON WORKS, OF ROCHESTER, NEW YORK, A CORPORATION OF NEW YORK.

BEVEL-GEAR-TESTING MACHINE.

Application filed May 8, 1924. Serial No. 711,903

This invention relates to a bevel gear testing machine, the main object of which is to detect and definitely measure errors in cutting the teeth of the gear due to misalinement of the generator tools or to necessary allowances which must be made in cutting the teeth to compensate for errors in the housing or gear carrier.

The machine is also useful in testing the teeth of spiral gears in that proper allowance may be made for distortion due to hardening.

I am aware that certain gear testing devices having tapered pointers have heretofore been employed for testing straight teeth and while they are adapted to indicate "cross bearing," they are not adapted to measure "cross bearing" in connection with proportional tooth thickness; that is, the pointers might indicate a certain approximate amount of "cross bearing," but at the same time the bearing might be heavy at both large ends or at both small ends of the gear tooth and the pointers represent at the best only an approximate means for securing this measurement.

One of the objects therefore, of my invention is to enable the operators to accurately produce any given amount of "cross bearing" to suit a given condition of mounting.

For example, in case the pinion axis is machined 0.020'' below the axis of the gear, the bevel gear testing machine herein described may be adjusted to meet this condition in an accurate, definite manner and may also be used in cases where the gear mounting or housing has a definite amount of spring or distortion under load.

The machine is also peculiarly adapted for testing the teeth of spiral bevel gears which are frequently warped by heat treatment in such a manner that the bearing originally produced in the soft or "green" gears is altered. That is, the "unwinding" of the spiral tooth, due to the contraction, crosses the bearing and it becomes necessary to put the opposite "cross" in the bearing of the "green" gear so that an even, full or central bearing may be secured in the finished hardened gear.

Another common characteristic of the spiral bevel gear is what is known to the trade as "bias bearing" which instead of following natural radial lines is inclined diagonally across the face of the tooth from the top of the tooth at the large end of the convex side toward the bottom of the tooth at the small end, the concave side of the tooth showing "bias bearing" inclined in the opposite direction and different "bias bearing" varies in different combinations of gearing in a manner known to those skilled in the art.

Owing to the bias nature of spiral bevel gear contact it is difficult to properly cross the bearing in such a manner as to allow for hardening changes and if a proper profile bearing is secured at opposite ends of the tooth, it is very liable to lose its correct profile and become "lame" when the bearing is "uncrossed" in hardening and takes its central position.

Aside from this, the amount of "cross" given is entirely a matter of judgment on the part of the operator and as the amount of inclination of bias bearing varies with each geared combination, it takes the most expert judgment to secure even roughly approximate results.

With this measuring machine by raising or by lowering, the pinion axis is placed above or below that of the gear as may be required and by securing an even central bearing of the desired profile, a duplicate bearing will be assured in case the amount of distortion or unwinding has been properly gauged; that is, that this unwinding has in effect, placed the pinion axis into engagement with that of the gear and this invention may be employed to accurately measure the result of various conditions of heat treating as may be employed, or different grades of steel.

It is practically impossible to accurately judge the amount of "cross bearing" from the appearance of the bearing and as this judgment must be extended to cover the effect of the "bias bearing," is apparent that any mechanism which will render this test more positive would be a distinct advance in the art, and one of the main objects of the present invention is to provide a machine for that purpose.

This may be accomplished by any suitable means whereby the apex of the pitch cones of the two intermeshing gears under test may be adjusted in their relation to each other by moving either the gear or the pinion spindle in a line perpendicular to its axis or more particularly, by raising the axis of one spindle above or below its natural intersection with the axis of the other spindle or by rendering either spindle askew any desired amount within tolerable limits.

Other objects and uses relating to specific parts of the device will be brought out in the following description.

In the drawings:—

Figure 1 is a top plan of one type of machine for carrying out the various objects of the invention showing a crown gear and pinion in section as intermeshing with each other for testing the accuracy of the teeth of the pinion.

Figure 2 is a vertical sectional view taken on line 2—2, Figure 1.

Figure 3 is a vertical sectional view taken on line 3—3, Figure 1.

Figure 4 is a top plan similar to Figure 1, showing two intermeshing crown gears of opposite obliquity as required for the inspection of spiral bevel gears.

As illustrated, this testing machine comprises a supporting base or frame —1— having a vertical journal bearing —2— and a horizontal guideway —3— extending radially from the axis of the bearing —2— at one side thereof for receiving and guiding a suitable carriage —4— for the gear supporting arbor presently described.

A rotary and axially movable sleeve —5— is journaled in the upright bearing —2— and has its lower end threaded at —6— and engaged with a stationary nut —7— on the lower end of the bearing —2— to cause said sleeve to be raised and lowered as it is rotated in reverse directions.

The upper portion of the sleeve is provided with axially elongated peripheral teeth —8— constituting a worm gear adapted to be engaged by a tangential worm —8'— which is secured to a horizontal shaft —9—, the latter being journaled in suitable bearings on the base —1— and is provided with a hand crank —10— by which it may be rotated for imparting rotary motion to the sleeve and incidentally, moving the sleeve axially through the medium of the stationary nut —7—.

The carriage —4— is provided with a horizontal bearing —11— in which is journaled a tubular mandrel or arbor —12— having means at one end for receiving and supporting a bevel crown gear as —A—, the opposite end being provided with a worm gear —13— adapted to be engaged by a worm —14—.

The test gear —A— is clamped to the arbor —12— by means of a bolt —15— extending through the arbor coaxial therewith and splined therein for axial movement and has its inner end provided with a T-head —16— adapted to engage a clamping plate —17— which in turn engages the gear —A— to hold the same against a clamping collar —18— on the arbor —12—, the outer end of said bolt being threaded and engaged by a hand nut —15'— for tightening and loosening the gear —A— on the arbor —12—.

The worm —14— is secured to a drive shaft —19— having a pulley —20— adapted to be connected to any available source of power for rotating the arbor with the gear —A— thereon.

The carriage —4— with the arbor —12— thereon may be adjusted axially of said arbor by means of a screw —21— which is journaled in suitable bearings in the frame —1— and is adapted to engage a nut —22— on the underside of the carriage for reciprocating said carriage as the screw is rotated in reverse directions and thereby to move the gear —A— axially toward and from the axis of the sleeve —5—, for gears of different sizes.

The outer end of the screw —21— is provided with a hand crank —23— by which it may be rotated and is also provided with a graduated circular scale —24— registering with a fixed mark on the adjacent end of the frame —1— to indicate the position or amount of axial adjustment of the gear —A— relatively to the axis of the sleeve —5—.

The T-head —16— of the clamping bolt —15— is passed through a diametrically elongated slot —17'— in the plate —17— so that when the bolt is loosened, the plate —17— may be turned to one position for quick removal from the bolt and to another position for tightening, thus permitting the gear —A— to be expeditiously placed in operative position and removed.

A vertical arbor —25— is journaled in the sleeve —5— to rotate independently thereof, but is held therein against relative axial movement so that any vertical movement imparted thereto by the rotation of the sleeve —5— and its engagement with the nut —7— will be transmitted to the arbor —25—.

The upper end of this arbor is provided with a tapered bearing —26— for receiving and supporting a horizontally swinging bracket —27— which is tightly clamped upon the tapered portion —26— of the arbor by means of a nut —28— or equivalent clamping device whereby the bracket may be rotated freely about the axis of the arbor and also moved axially of said arbor by the axial adjustment of the sleeve —5—.

This bracket —27— is provided with a horizontal guideway —29— extending radially from and at one side of the axis of the arbor —25— for receiving and supporting a pinion carriage —30— which is slidable along the guide way —29— and is provided with a journal bearing —31— for receiving and supporting a rotary arbor —32—, one end of this arbor —32— being tapered at —33— for receiving and supporting a bevel pinion —B— which is held in place by a clamping nut —34— on the adjacent end of the arbor.

The outer end of the arbor is provided with a hand wheel —35— by which it may be rotated for imparting similar rotary motion to the pinion and incidentally, to the gear —A— with which it meshes for testing the accuracy of the teeth of both gears.

The carriage —30— may be adjusted axially of the arbor —32— along the guideway —29— by means of a screw —36— which is journaled in suitable bearings in the bracket —27— and engages a nut —37— on the under side of the carriage, the outer end of said screw being provided with a hand crank —38— by which it may be rotated.

The object of providing means for adjusting the gear supporting arbors axially is to permit them to be used in testing gears of different diameters and while I have shown specific means for effecting these adjustments, it is evident that various other devices may be employed to accomplish the same result.

The object in providing for the rotary adjustment of the arbor —25— and bracket —27— carried thereby independently of the rotary adjustment of the sleeve —5— is to adapt the machine for testing bevel gears of different conical angles, the angular adjustment of the bracket —27— with the pinion-supporting arbor —32— thereon being indicated by a scale —39— on the upper face of the frame —1— just below the outer end of the bracket —27— and concentric with the axis of the arbor —25—, said bracket being provided with a pointer —40— movable along the scale —39—.

When the gears under test are accurately formed and properly adjusted for running engagement with each other, the apexes of their cones will be co-incident and in the same horizontal plane at right angles to the axis of the arbor —25— or rather the axes of the gear supporting arbors —12— and —32— will intersect each other at a point in the produced axis of the arbor —25—; but when the gears are deformed within tolerable limits from any of the causes previously mentioned, it becomes necessary to slightly vary the relation of the axes of the gears under test from the positions which they would assume if accurately formed and for this purpose it is found to be most convenient to adjust the supporting arbor —25— for the bracket —27—, axially and thereby to effect a bodily radial movement of the pinion-supporting arbor —32— lengthwise of said axis and transversely of the gear supporting arbor —12— which of course, would in this instance shift the apex of the pinion cone above or below the cone apex of the gear —A— according to the direction of adjustment as may be necessary to bring the imperfect gears in to the best running relation possible.

It is evident, however, that any other suitable means may be provided for effecting this change of relation in the axes of the gear-supporting arbors without departing from the spirit of the invention.

As illustrated, the zero graduation of the scale —39— is disposed in a vertical plane passing through the axis of the bracket-supporting mandrel —25— at right angles to the axis of the gear supporting arbor —12—, the scale extending through an arc of at least 90° or more from the zero graduation to permit the testing of the bevel gears of different conical angles or as shown in Figure 4 to permit the testing of the two crown gears as —A— and —A′—.

The main feature of the invention, however, consists in the provision of means for supporting the gears under test in mesh with each other in such manner that the apexes of their respective cones may be brought into coincident relation, or adjusted relatively to each other to vary that relation within certain prescribed limits commonly known as "tolerance" limits.

A dial plate —10′— is secured to the worm shaft —9— close to the outer upright face of the frame —1— to rotate therewith, relatively to a fixed mark on said face for indicating the amount of offset of the axis of the mandrel —32— above or below the horizontal plane of the axis of the gear mandrel —12— as may be necessary to bring the gears into proper running relation to each other for testing purposes.

When this adjustment is properly made, the gear arbor —12— with the gear —A— thereon is rotated somewhat slowly through the medium of the worm —14— and gear —13— thereby transmitting rotary motion to the pinion —B— in mesh therewith and any appreciable inaccuracy of the run out of the contacting faces of the gear teeth will cause a perceptible rocking movement of the bracket —27— which movement will be indicated by the pointer —40— on the scale —39— and will determine just what tooth or teeth require correction.

What I claim is:

1. In a machine for testing bevel gears, a frame, a support mounted on said frame, a spindle adapted to carry a bevel gear journaled in said support, a second support pivotally mounted on said frame for movement about an axis intersecting the axis of said spindle, a spindle, adapted to carry a second bevel gear, journaled in said last-named support, means for adjusting said last named support axially on its pivotal axis to move the second spindle bodily in parallel planes, means for rolling the gears together and cooperating means on said second support and frame for indicating the amount of any pivotal movement of the second support caused by imperfection in the mesh of the gears.

2. In a machine for testing bevel gears, a frame, a pair of rotatable spindles, one of which is adapted to carry a master gear and the other, the bevel gear to be tested, a support for each of said spindles mounted on said frame, one of said supports being movable about an axis at right angles to the axis of the spindle carried by the other support, means for adjusting said supports relatively to each other to bring the master gear and gear to be tested into engagement in the proper tangential plane, means for moving one of said supports bodily in parallel planes to offset the axis of the spindle carried thereby relative to the axis of the other spindle, means for indicating the amount of such adjustment, means for rotating the spindles to roll the gears together and cooperating means on said movable support and frame for indicating the amount of any pivotal movement of the movable support caused by any imperfection in the mesh of the gears.

3. In a machine for testing bevel gears, a frame, a carriage slidably mounted on said frame, a spindle, adapted to carry a bevel gear, journaled in said carriage, means for adjusting said carriage on the frame to move it axially of said spindle, a bracket pivotally mounted on said frame for movement about an axis intersecting the axis of said spindle, a carriage slidably mounted on said bracket, a spindle, adapted to carry a second bevel gear, journaled in said last named carriage, means for adjusting the last named carriage on said bracket to move it axially of the spindle carried thereby, means for adjusting said bracket bodily in parallel planes in the direction of its pivotal axis, means for indicating the amount of said adjustment, means for rotating said spindles to roll the gears together, and cooperating means on said bracket and frame for indicating the amount of any pivotal movement of said bracket caused by any imperfection in the mesh of said gears.

4. In a machine for testing bevel gears, a frame, a sleeve axially movable in said frame, a carriage slidably mounted on said frame, a spindle, adapted to carry a bevel gear, journaled in said carriage, an arbor journaled in said sleeve for rotation about an axis intersecting the axis of the first spindle, a bracket secured to the arbor, a carriage slidably mounted on said bracket, a spindle, adapted to carry a bevel gear, journaled in the second carriage, means for adjusting the sleeve axially to move the bracket carried thereby bodily in parallel planes in a direction at right angles to the first spindle, means for indicating the amount of such adjustment, means for rotating said spindles to roll the gears together, and cooperating means on said bracket and frame for indicating the amount of any pivotal movement of the bracket caused by any imperfection in the mesh of the gears.

5. In a machine for testing bevel gears, a frame provided with a vertical journal bearing, a nut carried by said frame, a rotatably and axially movable sleeve journaled in said bearing and provided with a threaded portion adapted to cooperate with said nut, a carriage slidably mounted on said frame for adjustment thereon in a direction radial of the axis of said sleeve, a spindle adapted to carry a bevel gear journaled in said carriage, an arbor journaled in said sleeve for movement about an axis intersecting the axis of said spindle, a horizontally swinging bracket secured to said arbor, a carriage slidably mounted on said bracket for adjustment thereon in a direction radial of the axis of said sleeve, a spindle, adapted to carry a second bevel gear, journaled in said carriage, means for rotating said arbor to impart thereto an axial movement to move the bracket carried thereby bodily in parallel planes to vary the relation between the axes of the two spindles, means for indicating the amount of said bodily movement, means for rotating said spindles to cause the gears to roll together, and cooperating means on said bracket and frame for indicating the amount of any angular movement of the bracket caused by any imperfections in the mesh of the gears.

In witness whereof I have hereunto set my hand this 31st day of March, 1924.

CHARLES H. LOGUE.